United States Patent [19]

Batra

[11] Patent Number: 4,646,350

[45] Date of Patent: Feb. 24, 1987

[54] SHOE WITH AUDIBLE MESSAGE

[76] Inventor: Vijay K. Batra, 4 Daybreak, Turkey Hill Village, Wayland, Mass. 01778

[21] Appl. No.: 652,006

[22] Filed: Sep. 19, 1984

Related U.S. Application Data

[63] Continuation-in-part of Ser. No. 592,513, Mar. 23, 1984, and a continuation-in-part of Ser. No. 568,743, Jan. 6, 1984.

[51] Int. Cl.$^4$ .................................................. G10L 5/00
[52] U.S. Cl. .................................... 381/51; 340/540; 36/50
[58] Field of Search .................................. 381/51–53; 340/272, 540; 36/50, 1; 24/117

[56] References Cited

U.S. PATENT DOCUMENTS 2,940,184   6/1960   Malone .............................. 36/50 X
3,702,999  11/1972   Gradisar ........................... 340/272
4,465,003   8/1984   Makabe et al. ................... 381/51 X
4,559,678  12/1985   Birkenstock ...................... 24/117 X Primary Examiner—E. S. Matt Kemeny
Attorney, Agent, or Firm—Frank A. Steinhilper

[57] ABSTRACT

A shoe has a device to provide an audible message such as a song or a word message. In one form, a shoe such as a child's shoe of the hook and loop variety has a stored audible message such as a micro circuit mounted on the shoe, or may receive an audible message such as an audible radio message. The audible message is activated in a suitable manner, and in a preferred embodiment the message unit is activated by opening or closing the shoe. In one form a switch is connected to the shoe opening device as, for example an electrically conductive member attached to the shoe closure, and opening and closing the shoe completes or interrupts an electrical circuit. In another form, a magnetic member on the shoe closure moves to make or break the circuit.

6 Claims, 7 Drawing Figures

SHOE WITH AUDIBLE MESSAGE

RELATED APPLICATIONS

This is a continuation-in-part of application Ser. No. 592,513, filed Mar. 23, 1984 and of application Ser. No. 568,743 filed Jan. 6, 1984.

BACKGROUND OF THE INVENTION

It is commonplace to have devices which in a selected position deliver an audible signal. Typically, a music box when closed is silent and when open delivers and/or repeats a song. Other similar musical devices have long been known. In addition, many devices are now known to speak a recorded message when in a pre-selected condition exists.

To approach the matter from a different context, shoes have long been known with ornamental designs carved into the leather of the shoe, and shoes with attached ornamentation are well known. It is not believed, however, that shoes have previously been available with an audible message, automatically activatable, inconspicuously held in or on the shoe.

GENERAL NATURE OF THE INVENTION

According to the present invention a shoe, such as a novelty shoe or a child's shoe, delivers an audible message when changed between the tied or fastened position and the untied or open position. In one form, the message is audibilized when the fastening is open and in another form the message is delivered when the fastening is closed.

In one embodiment of the invention a prepackged micro chip has a coded message which may be a song or tune or may be a verbal message. An electric circuit has a switch including a flexible arm which, when pressed to another concductor, closes the circuit and activates the audible message. In this form, a flap or tongue of insulating material is attached to the shoe fastening, and opening or closing the fastening moves this tongue into or out of position between the conductive flap and another conductor in the circuit device, thus completing or breaking the circuit.

According to another embodiment of the invention, a prepackaged micro chip, as in the previous embodiment, is mounted on the shoe and a magnetic member is mounted on the shoe closure, positioned to be brought against a switch portion of the micro chip; and opening or closing the shoe closure activates the micro chip to audibilize the message stored in the chip.

The circuit may be arranged to switch the sound on when the shoe is fastened and off when the shoe is open; thus in a child's shoe, the shoe may be a music maker when the child is wearing the shoe and it is securely closed. If desired, a separate switch, such as a hand operated switch may activate or override the closure switch.

The invention is particularly convenient with a shoe of the hook and loop variety with which a closure mechanism for the micro chip may be fastened to the closure loop of the shoe, although shoes of other types may also be employed.

The general nature of the invention having been set forth, the invention may be more fully understood in connection with the drawings, in which.

SPECIFIC DESCRIPTION OF THE INVENTION

Figure 1:
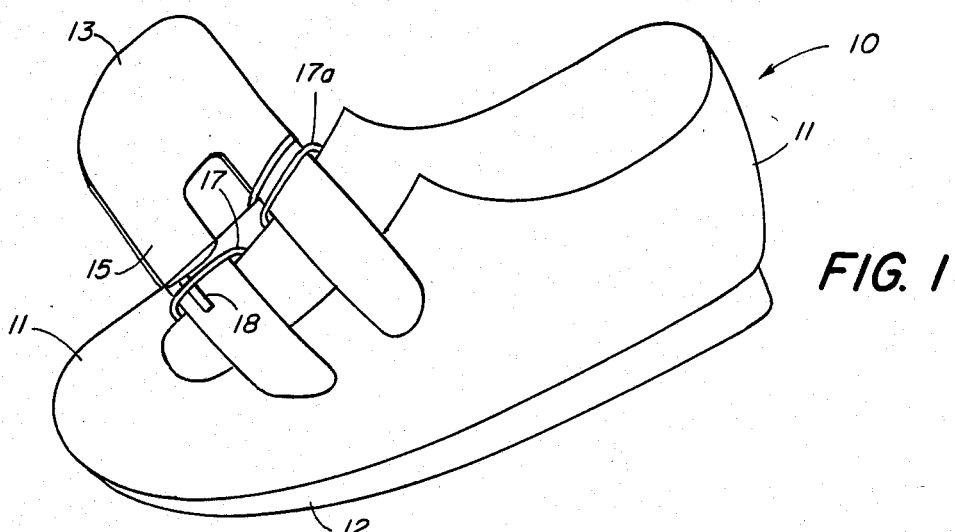
FIG. 1 is a perspective view of a hook and loop shoe with an audible message according to one embodiment of the invention.

In FIG. 1 is shown a shoe designated 10 of the hook and loop type, having a shoe upper 11, a sole 12 and a loop 13. Loop 13 has two prongs 15 and 16 passing under straps 17 and 17a secured to the shoe at a position beside the foot opening. The lower surface of prongs 17 and 17a is of hooked or fastening material such as that commonly available under the name Velcro, with a mating material on the surface of loop 13. This is conventional structure for a shoe of the hook and loop type. A flap or tongue 18 is secured to prong 15, passing under strap 17, and slips under the fastening material of the prong 15 (see FIG. 2). Tongue 18 is slidably fitted under this material, and slides further into and under it as the loop 13 is fastened to tighten the shoe on a wearers's foot. Thus, fastening and loosening the shoe causes this tongue to move in and out of the position between matetial 19 and prong 15.

Figure 2:
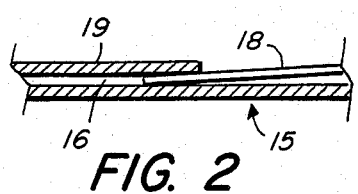
FIG. 2 is a partial cross section of a switch mechanism for the shoe of FIG. 1.

FIG. 2 shows a fragmentary cross section of the loop, showing prong 15 with a fastening material 19 overlying the prong. This material 19 is secured to the loop and prong 15 with a pocket 16 to receive tongue 18.

Figure 3:
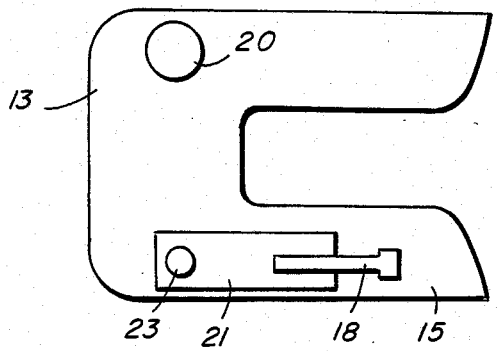
FIG. 3 is a bottom view of a loop according to one embodiment of the invention.

As shown in FIG. 3, mounted on the inner side of loop 13 is a small audio speaker 20 powered by a battery 23 which is connected to a micro circuit 21 mounted on loop 13. These elements are mounted on the loop 13 in convenient positions, with battery 23 preferably mounted for easy access for replacement. Circuit 21 and tongue 18 are mounted on prong 15. Tongue 18 reaches onto circuit 21 when loop 13 is fastened, and slips between circuit 21 and a conductive strip 25 (see FIG. 4), breaking the circuit when inserted between strip 25 and circuit board 21. Thus, tongue 19 acts as a switch, opening and completing the circuit 21. In this Fig. tongue 18 is of insulating material and when it is inserted into the circuit it interrupts or opens the circuit 21, and thus opening the circuit when loop 13 is opened to loosen or remove the shoe from a wearer's foot.

A micro chip contained in circuit 21 has stored therein a signal for an audio message. Such message is adapted to be played through speaker 20 when the circuit is completed or closed. Such circuitry, micro chip and stored signal are conventional in the electronics art and industry, and circuit boards of a size to fit on loop 13 are conventional.

Figure 4:
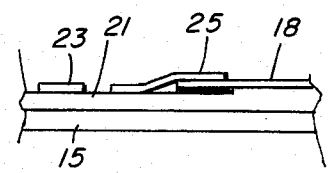
FIG. 4 is side view of a loop of the shoe in FIG. 1, having a switch thereon according to one embodiment of the invention.

FIG. 4 shows tongue 18 inserted between circuit board 21 and conductive strip 25 of the operating switch. In the position shown, tongue 18 is holding the switch open to maintain the audio circuit 21 in the inactive or silent state. If desired, the tongue mechanism may be reversed so that tongue 18 is withdrawn from the switch as the shoe is fastened, or the tongue may have an opening, not shown, so that the conductive strip 25 contacts circuit 21 when such opening of tongue 18 is adjacent to strip 25. Such reversal will cause the audible message to be delivered when the shoe is fastened and stopped when the shoe is open or loose.

As desired, when the shoe is placed on the wearer's foot and tightened thereon, the audible message may be stopped, according to one embodiment of the invention; or according to another embodiment it may be started when the shoe is properly fastened. Thus, the audible message may be a verbal message that the shoe is not properly fastened. Alternatively, the audible message may be a song or tune for a child's enjoyment, and may be played only while the shoe is properly fastened. The audible message shoe may be a novelty shoe for wearer's of all ages, but it is expressly intended for a child's shoe.

Figure 5:
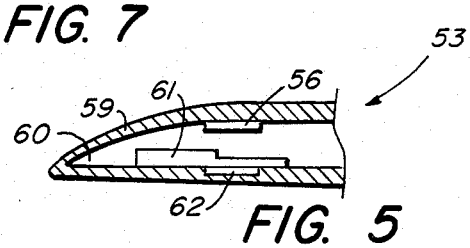
FIG. 5 is a perspective view of a shoe according to another embodiment of the invention.
Figure 6:
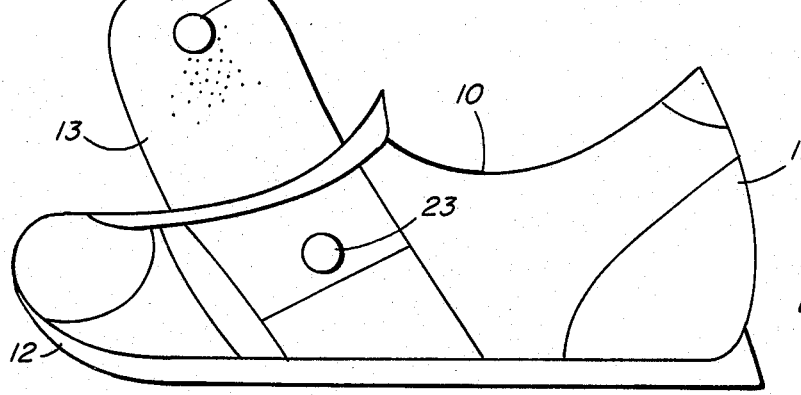
FIG. 6 is a side view of a loop of the shoe of FIG. 6 in the closed position, with a stored message member positioned thereon.

In FIGS. 5 and 6 is shown another embodiment of the invention, this being the presently preferred embodiment. A shoe 10 has an upper 11 and a sole 12. A loop 53 has a layer of a fastening material such as the layer on loop 13 of FIG. 1. A mating section 54 of like fastening material on the shoe upper 11 is adapted to secure the loop 53 in the usual manner of a hook and loop shoe. Mounted on the shoe upper 11 in a position to mate with the loop 53 is a magnet 56. This magnet 56 may be secured on the surface of the mating section 54, or may be secured inside the section, between shoe upper 11 and the fastening material.

FIG. 6 shows a micro chip 61 mounted on loop 53, the chip having a stored eletronic signal for an audible message. This micro chip is secured to loop 53 in a suitable and convenient manner, and as shown is buried within the loop.

FIG. 6 shows the loop 53, having an inner layer 58 of shoe material or fabric, such as leather, cloth, plastic or the like and an outer layer 59 of shoe material, with a pocket 60 between the two layers. A micro chip 61 is mounted within pocket 60, with a second magnet 62 fixed behind chip 61. Magnets 56 and 62 are positioned so that when the shoe is closed and properly fastened the two magnets are contiguous or in mating position, one magnet on each side of the chip 61.

Figure 7:
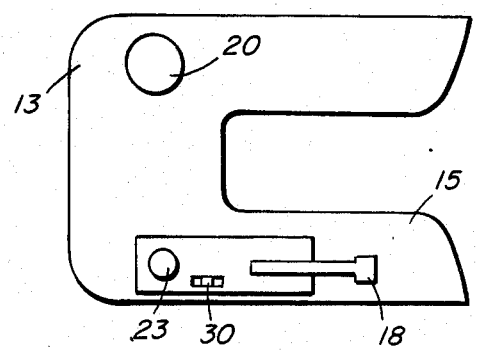
FIG. 7 is a bottom view of a loop according to another embodiment of the invention.

FIG. 7 shows a loop 13 having a speaker 20, a micro chip 21, switching arm 18 and other elements as in FIG. 3, with additionally a switch 30 adapted to over-ride switching arm 18. This may be particularly desired in various instances; for example parents may desire such a switch to over-ride a child's action regarding automatic switch 18, 19.

Micro chip 61 is of conventional construction and circuitry, being readily available on the commercial market, and has a stored program corresponding to a selected audible message; the chip may be designed and manufactured to be activated by means of a single magnet such as, for example, magnet 56; in a presently prefered embodiment chip 61 is designed and manufactured to be deactivated or turned off by two magnets, one on each side of the chip as, for example, magnets 56 and 62 in mating configuration. Thus, when the loop is secured in the fastening mode, circuit 61 is deactivated and the shoe is silent; while when the shoe is open the chip is activated and the stored message becomes audible.

Micro chips of opposite mode may also be used, such that when the two magnets 56 and 61 are placed on opposite sides of the chip the circuit will then be activated. Depending on the desired function, the shoe can be made to provide and audible message or warning or to sing when open or loose or can be designed to sing when closed and properly fastened.

A shoe according to the present invention affords a novelty item for people of any age, but it is thought to particularly useful and desirable for a child's shoe. A stored or received audible message can be a song or tune for a person's amusement or pleasure, or it can be informational. The audible message can be used on shoes of the hook and loop type or on shoes of other type which are designed with two mating surfaces which are brought together when the shoe is properly closed.

What is claimed is:

1. A shoe having a stored audible message comprising a shoe having a sole and an upper, said upper being adapted to be fastened by means of a shoe closure member when said closure member is positioned against a portion of said upper, an electrical circuit mounted on said shoe and adapted to deliver an electric signal corresponding to a predetermined audible message, an audio speaker mounted on said shoe and adapted to receive said electric signal and to convert said signal into audible sounds, switching means mounted on said closure member adapted to switch said circuit between an on condition and an off condition as said closure member is fastened to said upper and released from said upper, whereby said audible message is turned on and off as said shoe is fastened and opened.

2. The shoe of claim 1, having switching means thereon, said switching means including a first magnetic member mounted on said closure member and a second magnetic member mounted on said upper in a position adapted to mate with the position of said first magnetic member when said shoe is fastened, said switching means being switched on and off as said two magnetic members are brought into mating position and moved out of mating position.

3. The shoe of claim 1, wherein said electrical circuit has mechanical switching means, and a mechanical switching member mounted on said loop and positioned to move into contact with and out of contact with said mechanical switching means on said eletrical circuit, whereby fastening and unfastening said shoe closure switches said circuit on and off to render said audible message silent and audible.

4. A shoe according to claim 1, wherein said switching means is adapted to switch said circuit to the on condition when said closure member is open.

5. A shoe according to claim 1, wherein said switching means is adapted to switch said circuit to the off condition when said closure member is open.

6. A shoe according to claim 1, having a manually operated switch adapted to over-ride said switching means, whereby said circuit may be manually controlled between the on condition and the off condition regardless of open and closed position of said closure member.

* * * * *